United States Patent Office

3,546,051
Patented Dec. 8, 1970

3,546,051
METHOD FOR THE PRODUCTION OF TRANSPARENT COLOURED PICTORIAL PANES AND THE PICTORIAL PANES PRODUCED THEREBY
Rudolf Utz, Zufikon, Switzerland, assignor to Georg Utz A.G., Auhof, Bremgarten, Switzerland
Filed Dec. 20, 1967, Ser. No. 692,201
Claims priority, application Switzerland, Dec. 21, 1966, 18,316/66
Int. Cl. B44f 7/00
U.S. Cl. 161—18      3 Claims

ABSTRACT OF THE DISCLOSURE

The frame and the outline of the figurative representation located therein are injection moulded as an integral unit, the front of the resulting article is metallized, and a glass pane which has areas suitably coloured and in registry with the outlines of the figurative representation is secured in a recess in the rear of the frame.

BACKGROUND OF THE INVENTION

The invention concerns a method for the production of coloured transparent pictorial panes, more particularly emblazoned panes. Such pictorial panes serve as room ornaments and are suspended on window frames.

Emblazoned panes, individually produced from stained glass, are expensive and therefore beyond the reach of the vast majority of the public.

SUMMARY OF THE INVENTION

An object of the present invention is to provide a method which permits the production of such pictorial panes at low cost, which appear very similar to those produced individually from stained glass at considerably higher cost.

A further object of the invention is the pictorial pane produced by the method.

These and further objects of the invention will be apparent from the following detailed description.

BRIEF DESCRIPTION OF THE DRAWING

An exemplary embodiment of the invention will be described with reference to the figures of the accompanying drawing, wherein.

DESCRIPTION OF THE PREFERRED EMBODIMENTS

Figure 2:
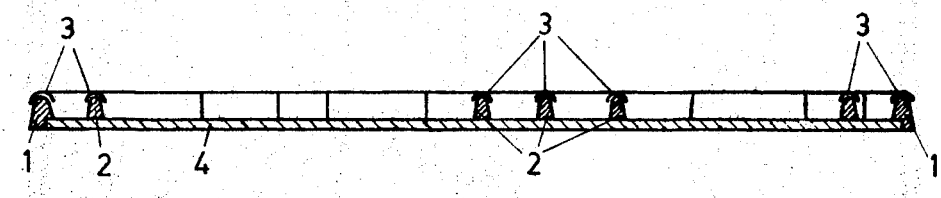
FIG. 2 is a view in section taken along line II—II of FIG. 1.
Figure 1:
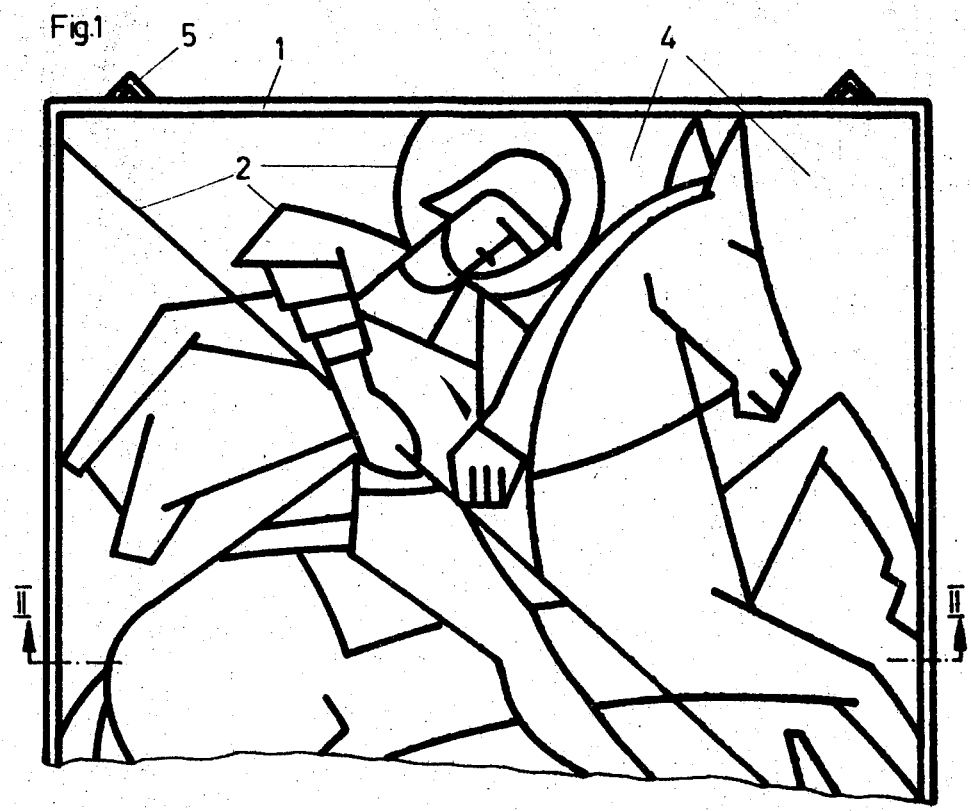
FIG. 1 is a view in elevation of a part of a pictorial pane of the invention.

First of all, a mould, suitable for injection moulding, is made to reproduce an artistic design, which is recessed where the figurative representation is to have the ribs 2 and the frame 1. Any script or numerals are also included in the figurative representation. An essential feature of the artistic design is that the figurative representation within the frame 1 is connected to the frame parts for support thereby by a sufficient number of ribs 2. Suspension eyelets 5 on the frame 1 may also be included in the mould as well as a recessed portion to receive an pane of glass 4, on the rear face of the frame 1. Fittings (not shown) to secure the glass may also be provided on the frame 1. The plastic parts of the representation and frame are then injection moulded by means of the mould in an injection moulding machine in a manner known per se. A suitably dyed polystyrol or polyamide or similar material is used as the injection plastic. The finished article thus produced includes the figurative representation 2 and the frame 1 integrally formed in one piece.

To produce the effect of authenticity, the front face of the pictorial pane, at least, can be given a metallic appearance. This can be obtained by impressing, for example a silver foil onto the front face of the representation. This is applied under pressure at a temperature of about 150° C. so that it adheres firmly to the ribs 2 and the frame 1. The parts of the foil located between the ribs 2 can then be easily removed leaving a coating 3 of foil on the ribs 2 and on the frame 1. However it is also possible to metallize the plastic parts for example in a vacuum (vaporization) or by spraying. In this way, the plastic parts could be coated front and back with a layer of metal.

The pane of glass 4 to be inserted in the recessed portion of the frame 1 is ground to the exact dimensions, thereby to fit flush with the rear face of the frame.

Stencils are provided for each coloured portion to be included in the finished pane.

Each stencil is adapted to cause certain portions of the pane to be coloured whilst marking out the remainder thereof. The contours of the portions to be coloured correspond exactly to the contours of the ribs 2 and the frame 1, which thus define on the finished pane, areas of coloured glass.

The various colours are applied to the sheet of glass 4 using the stencils and finally the colours are lightly burnt in.

The pane of glass 4 is thus ready for insertion into the rear of the plastic frame 1, and is either held in by catches on the frame 1 or by glueing. The front surface of the glass 4 thus rests tightly on the rear of the ribs 2 of the representation, so that, seen from the front, it appears that individual glass panes of different colours are held together by the ribs 2.

Although the preferred embodiments of the invention have been described, the scope of, and the breadth of protection afforded to, the invention are limited solely by the appended claims.

I claim:

1. A colored transparent pictorial pane, comprising an integral molded plastics unit, which includes a frame surrounding a plurality of ribs forming the contours of pictorial fields, a metallic-appearing coating at least on portions of the front faces of said frame and ribs, a glass pane attached to the rear side of said unit, and colored areas on said glass pane corresponding to said pictorial fields bordered by said ribs and frame.

2. The pictorial pane according to claim 1, in which said metallic-appearing coating comprises a metal foil adhering to said frame and ribs.

3. The pictorial pane according to claim 1, in which said glass pane is secured in a recess provided in the rear side of said plastics unit.

References Cited

UNITED STATES PATENTS 3,268,379    8/1966    Baker _____ 156—63
3,287,193   11/1966    Klein _____ 161—18X LELAND A. SEBASTIAN, Primary Examiner U.S. Cl. X.R.

156—63; 161—37, 413